United States Patent [19]

Komadina

[11] Patent Number: 4,915,836
[45] Date of Patent: Apr. 10, 1990

[54] SOLIDS DISPERSION TRANSFER PUMP WITH INTERMEDIATE CHAMBER

[75] Inventor: James J. Komadina, Elko, Nev.

[73] Assignee: Newmont Gold Company, Carlin, Nev.

[21] Appl. No.: 265,200

[22] Filed: Oct. 31, 1988

[51] Int. Cl.$^4$ .................................. B01D 33/38
[52] U.S. Cl. ........................ 210/416.1; 210/258; 417/219
[58] Field of Search ............... 210/198.1, 219, 684, 210/688, 416.1, 258, 338; 75/185, 106, 118 R; 423/25, 29; 266/101, 168, 170; 209/235, 268, 269, 272, 250, 353, 354; 415/213 A, 126; 417/219

[56] References Cited

U.S. PATENT DOCUMENTS

| | | | |
|---|---|---|---|
| 2,635,548 | 4/1953 | Brawley | 415/213 A |
| 2,743,154 | 4/1956 | Kaufman et al. | 23/14.5 |
| 2,785,930 | 3/1957 | Burnside | 415/213 A |
| 2,808,928 | 10/1957 | Kaufman et al. | 209/17 |
| 3,022,740 | 2/1962 | Wilfrey et al. | 415/126 |
| 3,269,325 | 8/1966 | Schwed et al. | 415/213 A |
| 3,540,834 | 11/1970 | Allerton | 415/213 A |
| 3,554,516 | 1/1971 | Denny et al. | 266/22 |
| 3,606,290 | 9/1971 | Ransom | 266/22 |
| 4,033,865 | 7/1977 | Derrick, Jr. | 209/275 |
| 4,065,382 | 12/1977 | Derrick, Jr. | 209/313 |
| 4,133,746 | 1/1979 | Dopson | 209/1 |
| 4,173,519 | 11/1979 | Parker et al. | 204/110 |
| 4,188,208 | 12/1979 | Guay | 75/105 |
| 4,251,352 | 2/1981 | Shoemaker | 209/45 |
| 4,289,532 | 9/1981 | Matson et al. | 75/105 |
| 4,333,827 | 6/1982 | Cummins, II | 210/258 |
| 4,370,858 | 2/1983 | Awerbuch et al. | 60/641.5 |
| 4,384,889 | 5/1983 | Wiewiorowski | 75/101 R |
| 4,416,774 | 11/1983 | Taylor | 210/236 |
| 4,528,166 | 7/1985 | McDougall | 423/23 |
| 4,552,589 | 11/1985 | Mason et al. | 75/105 |
| 4,575,421 | 3/1986 | Derrick et al. | 209/397 |
| 4,578,163 | 3/1986 | Kunter et al. | 204/110 |
| 4,692,240 | 9/1987 | Arbuthnot | 209/254 |
| 4,754,953 | 7/1988 | Brison et al. | 266/101 |

OTHER PUBLICATIONS

Bulletin, SALA Vertical Pump Type SPV.
P. A. Laxen, "Interstage Screen on the Adsorption Circuit of an 'In-Pulp' Process".
J. J. Komadina et al., "Carbon-in-Pulp Interstage Screening Using Submerged High Frequency Screens" SME Annual Meeting, Jan., 1988.
Gold & Silver Recovery Innovations, Phase III, vol. 7, ch. 42, "CIP Interstage Screens", pp. 4079–4184.
Gold & Silver Recovery Innovations, Phase III, vol. 7, ch. 43, "Interstage Carbon Transfer for CIP", pp. 4187–4202.
E. F. Legros, "Handling Granular Activated Carbon in the Gold Industry".
P. R. Bailey, "Design of the Adsorption Section" National Institute for Matallurgy (South Africa) Carbon School 1985.
R. L. Reinhofer, "The Design and Development of the Derrick CIP/CIL Interstage Screen", Intermountain Mining and Processing Operators Symposium, Elko; Nev., Nov. 2–4, 1988.

Primary Examiner—Richard V. Fisher
Assistant Examiner—Cynthia L. Nessler
Attorney, Agent, or Firm—Pennie & Edmonds

[57] ABSTRACT

A vertical pump for transferring a dispersion of solids in a liquid comprising an upper chamber for receiving the dispersion; an intermediate chamber in fluid communication with the upper chamber and including an outlet nozzle for discharging the dispersion; and a lower chamber in fluid communication with the intermediate chamber and including an impeller for inducing a vortex in the intermediate chamber. The dispersion is discharged from the outlet nozzle without deleteriously affecting the solids of the dispersion thereby transferring the dispersion independently of direct contact with the impeller. Generally, the solids are a friable sorbent, such as active carbon, and this pump can be used in combination with a screening apparatus which separates the solids from another liquid prior to delivering the solids to the upper chamber of the pump for forming the dispersion therein.

20 Claims, 5 Drawing Sheets

SOLIDS DISPERSION TRANSFER PUMP WITH INTERMEDIATE CHAMBER

BACKGROUND OF THE INVENTION

1. Field of the Invention

The present invention relates to a pump for transferring solids which are dispersed in a liquid from within the pump to another location. The pump of this invention is particularly useful for transferring friable solids, such as activated carbon.

2. Description of the Background Art

Precious metals, such as gold and silver, and other metals, such as copper, iron and nickel, are typically contained in ore materials when mined. Metal-containing ores are typically processed in accordance with one or more known techniques so that the metals, especially precious metals, can be separated and extracted from the mined ore.

One known method of recovering precious metals or other metals from metal-containing ores occurs in a carbonin-pulp system wherein activated carbon, usually in the form of activated charcoal, is mixed with a slurry of the ore in a cyanide solution. The carbon remains in contact with the slurry for a time sufficient to permit the gold and silver to become adsorbed by the carbon and, thereafter, the carbon is separated from the residue, typically by some type of interstage screen assembly. The carbon particles are generally larger than the finely ground or particles which permits the screening step to be accomplished with relative ease. A carbon-in-pulp system utilizes a plurality of mechanically or pneumatically agitated tanks arranged in series, usually 4 to 6. Each tank generally contains activated carbon having a different amount of gold adsorbed thereon; with the first tank having the highest and the last tank having the lowest. A slurry of a finely ground ore and the alkaline cyanide metal complex solution, is introduced into the first tank, while the carbon is advanced countercurrently to the flow of slurry from the last tank to the first tank. The slurry is agitated with the carbon adsorbent in the tank and the carbon adsorbs the cyanide metal complex as the slurry and the carbon adsorbent, i.e., the pulp, is agitated. The pulp is sequentially passed through the series of the pneumatically or mechanically agitated tanks so that most of the cyanide metal complex is adsorbed by the carbon.

After passing through the series of tanks, the processed tailings are discarded. As stated above, the carbon containing the adsorbed cyanide metal complex can be sequenced through the tanks in reverse order from the ore slurry. After the adsorbent has passed completely through the system, it has become "loaded" with the adsorbed metal complex. The loaded adsorbent is then chemically processed to remove most of the metal. The stripped adsorbent is then reactivated and then returned to the carbon-in-pulp system.

Another known method of recovering metals from metal-containing ores occurs in a carbon-in-leach system. The carbon-in-leach system is similar to the carbon-in-pulp system. The primary difference between the carbon-in-pulp system and carbon-in-leach system is that in the former, there are mixing tanks for cyanidation leaching prior to the carbon adsorption stage. In a carbon-in-leach system, cyanidation is conducted in the presence of carbon.

A further method of recovering metals from metal-containing ores occurs in a resin-in-pulp system. Generally, in a resin in pulp system, a leached metal-containing ore pulp is exposed to a resin, typically employed as moderately coarse particles, in a series of agitator tanks. The particular resin is, thereafter, separated from the pulp with the metal complex adsorbed thereon and, ultimately, the metal complex is removed from the resin to recover quantities of the particular metal present in the ore.

A detailed review of the screening systems currently in use for separating either the carbon or resin adsorbents from the slurry of a pulp can be found in the following art: P.A. Laxen, "Interstage Screens On The Adsorption Circuit Of An 'In-Pulp' Process" and Gold & Silver Recovery Innovations, "CIP Interstage Screens", Phase III, Vol. 7, Ch. 42, pp. 4079–4184. Initial carbon-in-pulp ("CIP") plants utilized external vibrating screens over which the pulp with entrained carbon was pumped by air lifts from the bottom of the adsorption tanks. Each tank utilized a umber of external vibrating screens to which external air lifts on the side of each tank lifted pulp plus carbon onto the screens. The screeen pulp then would flow by gravity to the next tank while the carbon on the screen flows back to the tank from which it came except periodically when it is diverted to the next tank countercurrent to the pulp flow. The disadvantages associated with this type of system include (1) the capital cost of external vibrating screens, air lifts and compressors for air supply; (2) additional cost of supporting structures for the screens; (3) compressed air and screen maintenance are relatively high for a large scale plant with the system being much more energy intensive than it needs to be; (4) the large amount of air injected into the pulp results in substantial carbon scaling; (5) the efficiency of the system is low since a portion of the carbon is continuously not in contact with pulp and therefore not absorbing metal values therefrom; and (6) excessive operator manpower required on large plants for monitoring the system for ruptures and/or replacement of the screen media.

To upset these disadvantages, systems have been installed which utilize both external and internal screens, with the external screens being used for carbon transfer only. The majority of the pulp (about two-thirds) flows to internal air cleaned screens while the remainder of the pulp is continuously pumped by a submergible pump to the external screens with the carbon either being returned to the leach tanks or transferred to the next tank as required for countercurrent carbon transfer. The pulp from the external screen, again one-third of the total, flows continuously to the next tank.

In about 1982, a new type of screen evolved, these known has the EPAC (equal pressure air cleaned) screens. By damming the pulp flow on the downstream side of the screen, the hydrostatic pressure is equalized on both sides of the screen and is not as readily blinded by carbon particles pinned to the screen surface. This simple technique increases the screen capacity of a screen panel per unit of length by a factor of 10 or more. An illustration of this type screen is shown in U.S. Pat. No. 2,808,928. A wide variety of types, sizes and configurations of EPAC screens is known in the prior art. Each of these systems has its own attendant disadvantages mostly relating to the difficulties in keeping the screen clean of carbon build up along with the difficulties of achieving high throughput. In addition, the quantities of air required and the operational aspect for use of such air create further disadvantages for this type system.

One improvement on the EPAC screens is known as KAMBALDA screens. These screens were able to dispense with the air cleaning system by mounting the screen horizontally in an upper portion of the tank and by installing an agitator blade beneath the screen in a manner such that pulp is directed against the screen with the agitation caused by the blades continually moving the carbon away from the screen to prevent build up. The screened pulp is removed from the top of the tank and is introduced into the subsequent tank in the lower portion thereof with the mixture in the second tank causing the pulp to flow upwardly and onto the next screen. The agitator blade is known as a sweeper arm and is mounted a few inches away from the bottom of the screen. While the total energy requirements for this type of screen is less than conventional EPAC screens, the disadvantages for this system relate to the extensive amount of structural steel required above the tank to support the agitator with its sweeper, as well as the screens located thereabove.

Another improvement on the EPAC screens was made at North Kalgurli Mines and is known as the NORKAL screen. This screen consist of a cylindrical screen basket along with pedals which rotate along its circumference to sweep away carbon build up. Screened pulp flowing into the cylindrical screen bakset is drained through an out flow and is directed to the next tank. The improvement of this type of arranagement relates to an increase in throughput with a corresponding decrease in energy necessary to achieve that throughput. The disadvantages of such a system are similar to those identified above for the KAMBALDA screens.

As noted in the articles cited above, the shortcomings associated with known interstage screening installations are their energy intensive operational requirements, which are predominantly ascribed to the compresssed air requirements; the high maintenance and operational costs, since, in order to advance the adsorptive species on a continuous or semi-continuous basis, as is necessary, the internal launder or mechanical interstage screening system must pump the total pulp (i.e., slurry and carbon); the low throughput per unit area; and the absence of any separation or concentration of the adsorptive species from the pulp. Additionally, due to the abrasive nature of the adsorptive species, the conventional wire or cloth interstage screens have a relatively short effective life which necessitates constant inspection and replacement, else the adsorptive species and, hence, the adsorbed metals, remain in the pulp and cannot be recovered.

Other problems associated with prior art installations relate to carbon transfer pumps used in such installations and, more specifically, the deleterious effect they have on the sorbent.

SUMMARY OF THE INVENTION

The invention relates to a vertical pump for transferring a dispersion of solids in a liquid. This pump has an upper chamber for receiving the dispersion; an intermediate chamber in fluid communication with the upper chamber; and a lower chamber in fluid communication with the intermediate chamber. The upper chamber includes a top opening and a bottom opening with the top opening having a larger cross sectional area than the bottom opening. The bottom opening of the upper chamber forms the entry to the intermediate chamber. The intermediate chamber includes means for discharging the dispersion, while the lower chamber includes means for inducing a vortex in the intermediate chamber so that the dispersion may be discharged through the discharging means without deleteriously affecting the solids of the dispersion, thereby transferring the dispersion independently of direct contact with the vortex inducing means.

Preferably, the vortex inducing means comprises an agitator and the discharging means is an outlet nozzle. The agitator may be an impeller which rotates in a horizontal plane. It is advantageous to provide the intermediate chamber with a curved outer cross section to facilitate formation and rotation of the vortex. Thus, the discharging means outlet nozzle is tangentially positioned with respect to the curved outer cross section of the intermediate chamber to facilitate the exit of the dispersion. This indirect contact of the dispersion is particularly important when the solids are a friable sorbent, such as activated carbon.

This pump can be used in combination with a screening apparatus adjacent the upper chamber for delivery of the solids thereinto, with the upper chamber including means for directing a liquid thereinto for forming the dispersion with the solids. The combination may further include means for intermittently delivering the solids into the upper compartment, preferably in the form of means for relative movement of the pump and screening apparatus between the adjacent position to a separated position whereby the solids are not received by the upper chamber. The relative movement means may be a pneumatically driven cylinder and piston assembly.

DESCRIPTION OF THE PREFERRED EMBODIMENTS

Figure 1:
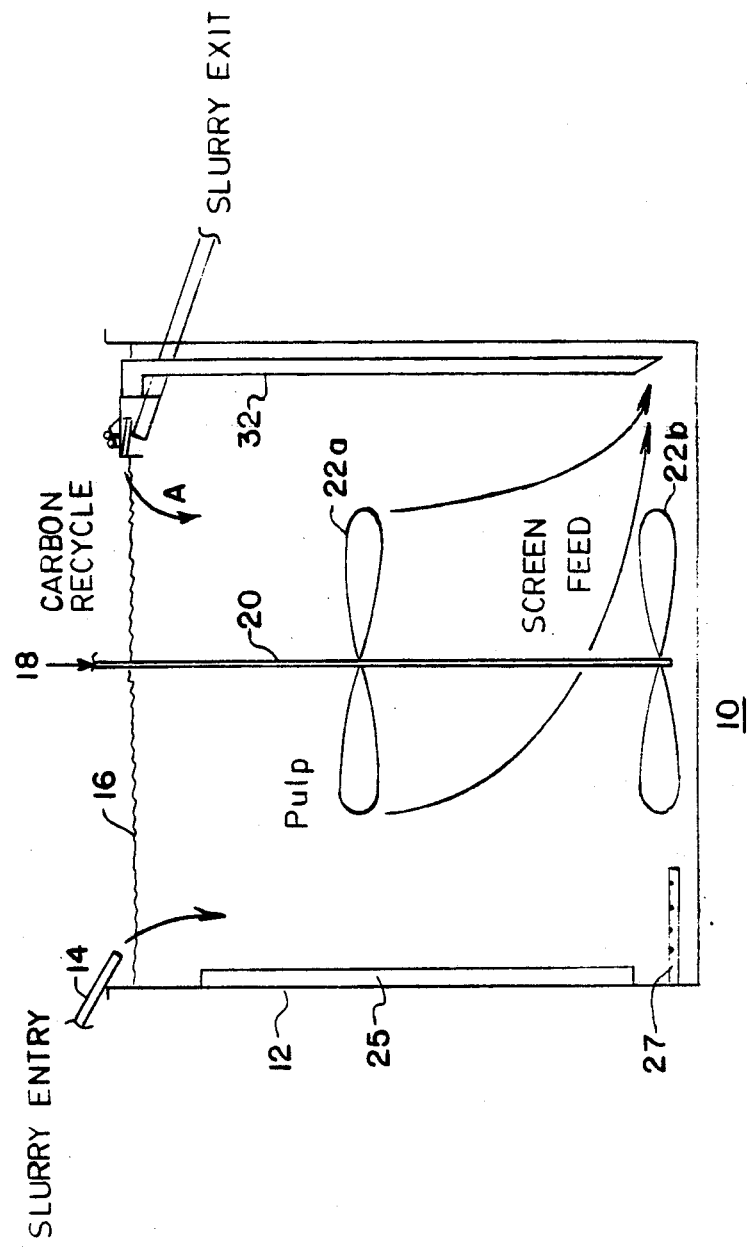
FIG. 1 is a schematic illustration of one vessel used in accordance with the present invention.

The general process of recovering gold from a gold bearaing ore employing a combined cyanidation and adsorption treatment is described in U.S. Pat. No. 4,188,208, the entire content of which is incorporated herein by reference. While the description in that U.S. Patent relates particularly to gold recovery, as does the description provided hereinbelow, the underlying theory is used in processes for recovering silver, iron, copper, nickel and other metals. The recovery of each of these metals froma mined ore is within the scope of the present invention.

An aqueous slurry is prepared by grinding a crushed metal-containing ore to about 50% to about 70% minus 200 mesh and mixing the ground ore with a sufficient amount of water so that it forms a slurry with about 40 to about 50% solid in water. Alternatively, the ore can be wet grinded to form the slurry. Preparation of the slurry in this manner is offered as an illustration; however, any of the particular techniques for forming the slurry which are known to those skilled in the art are available for use and are contemplated by the method of this invention.

The ore may optionally be subjected to oxidation treatment prior to cyanidation treatment to enhance the quantities of metal recovery by employing any pre-oxidation technique known to those skilled in the art.

The slurry is then treated with a substance, such as cyanide, and in a manner such that a metal complex is formed between the particular substance used for treating the slurry and the metal present in the ore, which metal complex is capable of being adsorbed by the particular adsorbent employed. For purposes of this description, a method for recovering gold from a gold-bearing ore in a carbon-in-pulp installation is described. It is to be fully understood, however, that the method and system of this invention are applicable to the recovery of other metals in carbon-in-pulp, carbon-in-leach and resin-in-pulp installations. Of course, appropriate substitutions of components which are apparent to those skilled in the art must be considered and, if necessary, implemented. Thus, in a process for recovering gold from an ore containing the same, the gold is leached from the slurry in the form of a cyanide complex, specifically, an aurocyanide complex. For instance, sodium hydroxide and sodium cyanide, or potassium hydroxide and potassium cyanide, are added to the aqueous pulp in amounts such that the pulp contains from about 0.1 to 10% by weight of lime or an alkali metal-hydroxide and from about 0.1 to 1.0% by weight of the alkali metal cyanide. In addition, up to about 10% by weight of sodium carbonate or potassium carbonate may also be added to the pulp. A resulting complex is produced which can be adsorbed by certain adsorbent solids, such as, activated carbon.

The adsorptive properties of activated carbon are ascribed to its large internal surface area, its pore size distribution, and the exteral surface area. Activated carbon functions by adsorption due to the imbalance of the forces upon the carbon atoms constituting the surface of the pore walls. Carbon is generally selective for gold and silver cyanide complexes, however, other complexes of copper, iron or nickel may be adsorbed. The carbon can be obtained from any conventional source, such as, for instance, dense woods, nut shells, fruit pits or coke derived from anthracite coal or petroleum products, and can be activated in any conventional manner. Preferably, the carbon is soaked in water having a pH of about 11 for at least about 4 hours prior to being added to the pulp. For reasons explained hereinbelow, the size of the carbon particulate should be greater than the size of the pores of the screen employed in the interstage screening phase. It is therefore preferable to employ carbon particulate having a mesh size of about 6 to about 16.

While the method of the present invention may be practiced in one stage, that is, in one tank or vessel, it can be practiced in a plurality of tanks arranged in series, with each tank having one or more interstage screening systems. Preferably, the invention is carried out in 4 to 6 tanks, with the most preferred being a 6 tank arrangement.

Accordingly, the following description relates to a single sorbent vessel of the present invention, it being fully understood, however, that two or more of the described vessels may be used in accordance with this invention.

Referring now to the drawings, particularly to FIG. 1, illustrated is the sorption vessel of the present invention, which is generally designated as reference numeral 10. Sorbent vessel 10 includes a tank 12 which includes the slurry described hereinabove and a sorbent, such as, the activated carbon described above. The admixture of aqueous slurry and sorbent will hereinafter be referred to as a pulp. It is to be further understood that the slurry includes the cyanidation reagent. Inasmuch as slurry is continuously introduced into tank 12 via slurry entry means 14 and further since sorbent is continuously introduced into tank 12 at the proximity of arrow A the pulp is maintained in the tank at a predetermined level, which level is represented as reference numeral 16. Although not shown, slurry entry means 14 can be a downcomer which has a first end proximate or associated with a source of the slurry and a second end disposed within tank 12.

Sorption vessel 10 further includes agitation means 18 which, when actuated, agitates the pulp to facilitate contact between the sorbent and the slurry, thereby increasing the degree of sorption of metal values from the slurry by the sorbent. In a preferred embodiment, agitation means 18 includes a rotatable shaft 20 and two impeller blades 22a, 22b associated therewith. It is to be understood, however, that other agitatin means may be employed to facilitate contact betwen the sorbent and the slurry.

Sorption vessel 10 can optionally include one or more baffles 25 to direct the movement of the pulp within the tank to desired locations, as will be more clearly understood from the description provided below.

Figure 2:
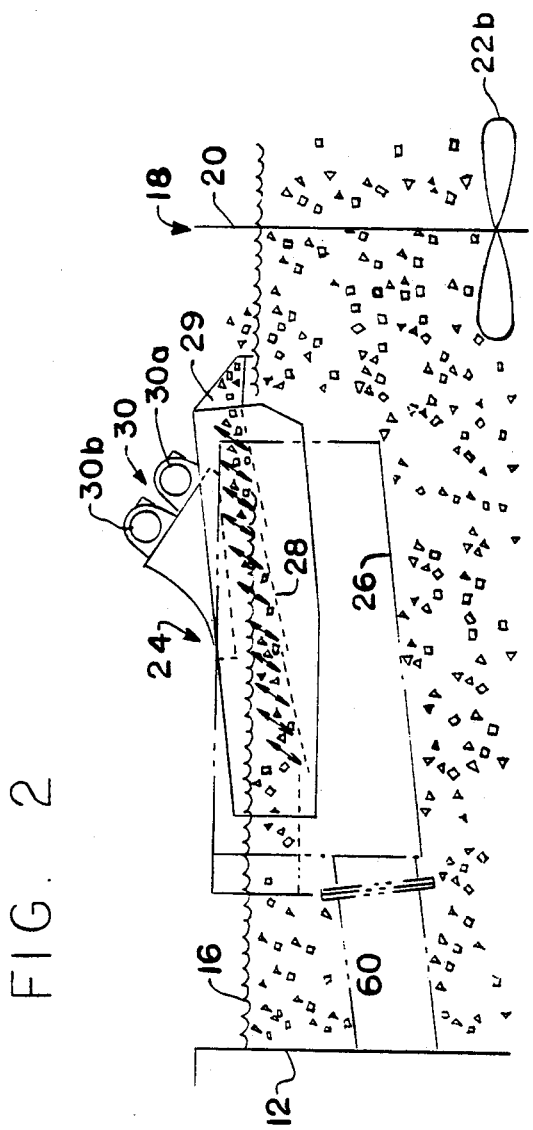
FIG. 2 is a side view of the interstage screening system used in accordance with the present invention with the internal structural components thereof being exposed and illustrating pulp disposed therein.

Sorption vessel 10 further includes a screening system 24 that is disposed within tank 12. Referring now to FIG. 2, screening system 24 is illustrated in greater detail and, as shown, is at least partially submerged beneath the predetermined pulp level 16. The extent to which screening device 24 becomes submerged in the pulp is determined by the liquid level of the pulp and the amount of pulp introduced into screening device 24. Screening system 24 isolates pulp disposed therein from the pulp contained within tank 12 by way of a housing 26, which provides a hydraulic differential betwen the predetermined pulp level 16 and screening system 24. As pulp is continuously introduced into screening system 24, sorbent is selectively and continuously separated from the slurry by way of screen members 28. Screen member 28 can include one or more individual screen panels or, alternatively, screen member 28 can include a continuous linear screen, such as, for example, the one illustrated in U.S. Pat. No. 4,692,240, the entire content of which is incorporated herein by reference. In a most preferred embodiment, screen member 28 is angularly disposed with respect to pulp level 16. Preferably, screen 28 is vibrated by vibration means, such as the dual motor arrangement 30. However, a single motor arrangement is also within the scope of this invention. Motors 30 can also be used to impart motion to a continuous linear screen in the event that such an embodiment is opted for.

Screen member 28 has openings ranging in size, for example, from about 0.1 mm to about 1 mm, with a preferred size of 0.7 mm for separating activated carbon in a CIP installation. Screen member 28 is most preferably fabricated from urethane to avoid the abrasive effect of carbon particulate.

Screening system 24 has developed from this technology and now is available from Derrick Manufacturing Corporation, Buffalo, N.Y. as their Flow Line Cleaner.

Referring once again to FIG. 1, sorption vessel 10 further includes means for directing pulp onto screen member 28, whereby the pulp is displaced toward screening system 24 and, hence, screen member 28 by way of the aforedescribed hydraulic differential. For instance, the means for directing the pulp can include conduit means such as upcomer 32. As illustrated, upcomer 32 has a lower end disposed within tank 12 at a position below pulp level 16, preferably at the bottom portion of tank 12, and further has an upper end disposed within the proximity of screening system 24. Alternatively, a baffle (not shown) can be used to direct pulp into screening system 24. The degree of pulp to be directed onto screen member 28 can be regulated by a feed weir 34 as shown in FIG. 3, it being understood that feed weir 34 can preclude entry of pulp into screening system 24 or can permit entry of pulp by way of valve 36, associated with feed weir 34, which permits the opening and closing of feed weir 34.

Conduit means 32 can further include a distribution box 33 associated with the upper portion thereof and withn the proximity of screening system 24 to uniformly distribute pulp into screening system 24.

Additionally, tank 12 can be provided with one or more spargers (not shown) for introducing air into the pulp for reasons well understood by the skilled artisan.

Figure 3:
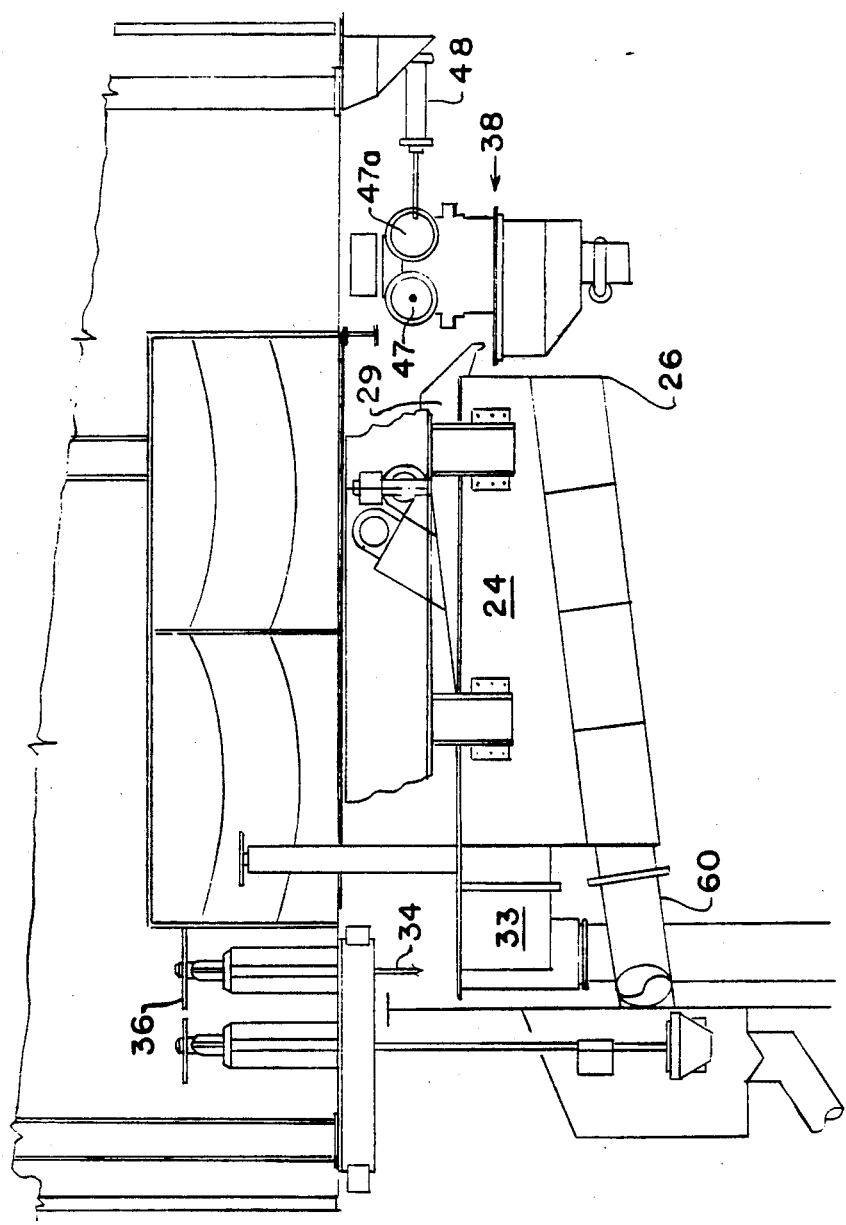
FIG. 3 is a schematic representation of the cooperative arrangement of the interstage screening system and the pump of the present invention.
Figure 4:
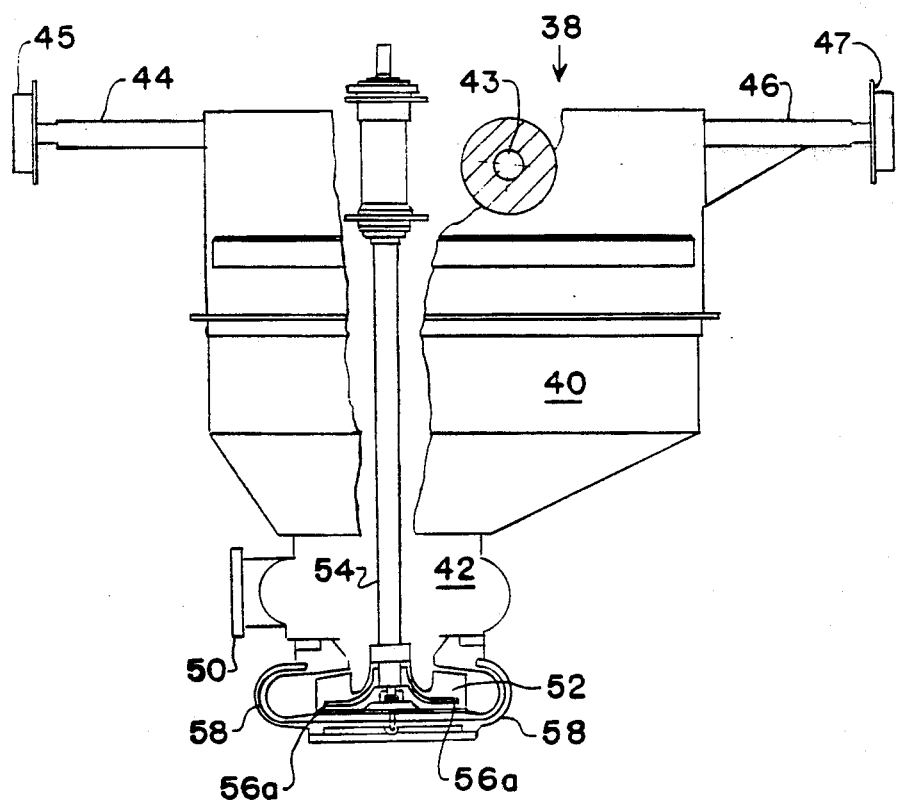
FIG. 4 is a perspective view of the pump of the present invention with a portion cut away to expose the agitation means.
Figure 5:
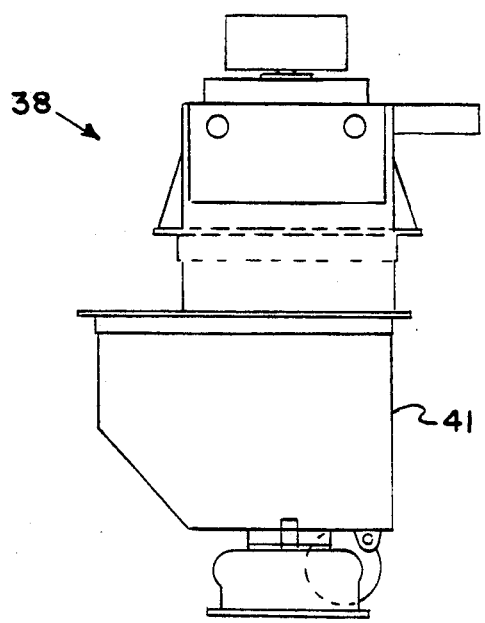
FIG. 5 is a side view of the pump of the present invention.

Referring to FIG. 3, sorption vessel 10 can further include a pump 38 for removing sorbent and/or pulp from tank 12 via screening system 24. Referring now to FIGS. 3 to 5, pump 38, which is a vertical pump, includes an upper chamber 40 for receiving pulp or, for that matter, any type of solid-liquid dispersion. Upper chamber 40 includes an opening at the top thereof and an opening at the bottom portion to provide fluid communication between upper chamber 40 and intermediate chamber 42. Upper chamber 40 further includes a conduit or nozzle 3643 for directing liquid into pump 38 for forming a dispersion with the solid particulate introduced therein which liquid can be stored in reservoir 41. Upper chamber 40 can further include a second conduit 46 for intermittently delivering solids into upper chamber 40. In a most preferred embodiment, pump 38 is provided with a piston 48, as is best seen in FIG. 3, which provides relative motion between a position adjacent screen system 24 and a position removed from the adjacent position whereby solids are prevented from entering upper chamber 40. Movement of pump 38 between these positions is facilitated by flanged wheels 45, 47 rotatably attached to pump 38 by axles 44, 46. Two sets of wheels 45, 45a and 47, 47a are provided on each side of pump 38 as shown in FIG. 3, for rolling movement along a structural beam or rail (not shown). Piston 48 can be either mechanically or pneumatically actuated to move pump 38 to and from the aforedescribed positions. With this arrangement, solids can be delivered directly into reservoir portion 41 by sliding down ramp 29 of screening system 24.

As seen in FIG. 4, intermediate chamber 42 further includes a discharge conduit 50 for discharging the dispersion from pump 38. Still referring to FIG. 4, pump 38 further includes a lower chamber 52 which is in fluid communication with intermediate chamber 42.

Lower chamber 52 further includes means for inducing a vortex in intermediate chamber 42, such as agitator 54. Agitator 54 further includes impeller blades 56a, 56b which are disposed within lower chamber 52. Rotation of impeller blades 56a, 56b within lower chamber 52 induces a vortex within intermediate chamber 42 and which precludes solids from entering lowering chamber 52 and which further causes the solids to be discharged out of pump 38 through discharge conduit 50. In accordance with this arrangement any solids, such as the carbon sorbent used in accordance with the present invention are discharged from pump 38 without being deleteriously affected, inasmuch as the solid are transferred from the pump without ever making contact with impeller blades 56a, 56b.

In a preferred embodiment intermediate chamber 42 includes a curved outer-crossed sectional portion 58 to facilitate the formation and rotation of the vortex and discharge conduit 50 is tangentially disposed with respect to curved portion 58.

In acordance with the method of the present invention, which is best appreciated by collectively referring to FIGS. 1, 2, and 3, slurry is first introduced into tank 12 via slurry entry means 14. Sorbent is introduced into tank 12 in any conventional manner, but is preferablby introduced at the locus at arrow A, to create a pulp within tank 12 and further to enable the sorbent to contact the slurry.

Metal values are sorbed fromthe slurry in tank 12 by mixing the pulp, such as by actuating agitation means 18, which assures homogeneity between the sorbent and the slurry and which substantially uniformly distributes the sorbent throughout the slurry, thereby facilitating the sorption of the aurocyanide complex by the sorbent. Because of the continuous introduction of slurry via slurry entry means 14 accompanied by continuous introduction of sorbent, pulp level 16 is substantially maintained at all times.

A portion of the pulp is directed into screening system 24 where it becomes isolated from the pulp remaining in tank 12. After having been passed over screen member 28 the sorbent, now impregnated with metal values, is separated from the slurry by moving upwardly along the screen member 28 due to the vibration imparted thereto by motors 30a and 30b. The slurry of the pulp passes through the screen openings while the carbon sorbent is retained upon the screen member 28. The vibration urges the sorbent to move upwardly along the screen to ramp 29, where it can slide back into the pulp in tank 12 by the force of gravity.

The separated sorbent is returned into tank 12 on a substantially continuous basis for further adsorption; however, any portion of the sorbent can be removed from the screening system so that the metal values may be desorbed therefrom or to transfer the sorbent to another tank. It is most preferable to primarily return the separated sorbent into tank 12, while intermittently removing the portion of the sorbent from screening system 24. This is accomplished by urging the sorbent along screen member 28 in the manner hereinbefore described, and out of screning system 24 while pump 38 is advanced from a position removed from screening system 24 to a position proximate to the screening system so that the sorbent can be introduced into pump 38 sliding down ramp 29 due to the force of gravity for by direct introduction into reservoir 41.

During the step of separating the sorbent from the slurry, the slurry passes through screen member 28, accumulates within housing 26 where it continues to remain isolated from the pulp in tank 12. The isolated slurry is removed from housing 26 by way of conduit means, such as pipe 60 and is preferably directed to a downstream tank for further treatment, which tank is in fluid communication with the upstream tank via pipe 60. Alternatively, when the gold values have been substantially adsorbed from the slurry, the slurry can be directed to a storage area, typically referred to as a tailings pond by those skilled in the art.

As the slurry is directed to one or more downstream vessels, the amount of metal values associated with the slurry is reduced inasmuch as the metal values are continuously being adsorbed therefrom. Accordingly, the amount of metal values associated with the sorent is increased in each of the vessels as it is simultaneously directed therethrough.

In a preferred embodiment, sorbent is countercurrently directed through the vessels with respect to the advancement of slurry therethrough and, as such, the amount of metal values sorbed by the sorbent increases or it is countercurrently advanced from the last tank of the series in a upstream direction toward the first tank.

What is claimed is:

1. A vertical pump for transferring a dispersion of solids in a liquid comprising:
   an upper chamber open to the atmosphere for receiving said dispersion;
   an intermediate chamber in fluid communication with said upper chamber and including means for discharging said dispersion in a horizontal direction; and
   a lower chamber in fluid communication with said intermediate chamber and including means for inducing a vortex in said intermediate chamber whereby said dispersion is discharged from said discharging means without deleteriously affecting the solids of said dispersion thereby transferring said dispersion independently of direct contact with said vortex inducing means.

2. The pump of claim 1 wherein the vortex inducing means comprises an agitator and wherein said discharging means is an outlet nozzle.

3. The pump of claim 2 wherein the agitator comprises an impeller which rotates in a horizontal plane, and wherein said solids comprise a sorbent.

4. The pump of claim 1 wherein the upper chamber includes a top opening and a bottom opening with the top opening having a larger cross-sectional area than the bottom opening and further wrhein the bottom opening forms the entry to said intermediate chamber.

5. The pump of claim 1 in combination with a screening apparatus adjacent to said upper chamber for delivery of solids thereinto; and further wherein said upper chamber includes means for directing a liquid thereinto for forming said dispersion with said solids.

6. The combination of claim 5 further comprising means for intermittently delivering said solids into said upper chamber.

7. The combination of claim 6 wherein said intermittent delivery means comprises means for relative movement of said pump and screening apparatus between an adjacent position and a separated position whereby said solids are not received by said upper chamber.

8. The combination of claim 7 wherein said relative movement means comprises a piston and cylinder.

9. The combination of claim 8 wherein said piston and cylinder include pneumatic driving means.

10. A vertical pump for preparing a dispersion of solids in a liquid and for transferring said dispersion comprising:
    an upper chamber open to the atmosphere for receiving solids and including means for introducing a liquid therein so as to form a dispersion of said solids in said liquid;
    an intermediate chamber in fluid communication with said upper chamber and including means for discharging said dispersion in a horizontal direction; and
    a lower chamber in fluid communication with said intermediate chamber and including impeller means for inducing a vortex in said intermediate chamber whereby said dispersion is discharged from said discharging means without deleteriously affecting the solids of said dispersion thereby transferring said dispersion independently of direct contact with said impeller.

11. The pump of claim 10 wherein said impeller means rotates in a horizontal plane, said intermediate chamber has a curved outer cross section to facilitate formation and rotation of said vortex, said discharging means is an outlet nozzle tangentially positioned with respect to said curved outer cross section of said intermediate chamber for discharging said dispersion in a horizontal direction, and wherein said solids comprise a sorbent.

12. The pump of claim 10 wherein the upper chamber includes a top opening and a bottom opening with the top opening having a larger cross-sectional area than the bottom opening and further wherein the bottom opening forms the entry to said intermediate chamber.

13. The pump of claim 10 in combination with a screening apparatus located in a first position adjacent to and at least partially above said upper chamber for intermittently delivering said solids thereinto.

14. The combination of claim 13 wherein said screening apparatus includes means for relative movement of said pump and screening apparatus between said first position and a second position whereby said solids are not received by said upper chamber.

15. A combination for separating solids from a first dispersion and for forming and transferring a second dispersion of said solids comprising:
    a screen apparatus for separating solids from a first liquid; and
    a pump comprising:
    an upper chamber open to the atmosphere operatively associated with said screening apparatus for intermittently receiving said solids therefrom and including means for introducing a second liquid thereinto to form a second dispersion of said solids in said second liquid;
    an intermediate chamber in fluid communication with said upper chamber and including means for discharging said second dispersion in a horizontal direction; and
    a lower chamber in fluid communication with said intermediate chamber and including an impeller rotating horizontally therein for inducing a vortex in said intermediate chamber whereby said second dispersion is discharged from said discharging means without deleteriously affecting the solids of said second dispersion thereby transferring said second dispersion independently of direct contact with said impeller.

16. The combination of claim 15 wherein said impeller rotates in a horizontal plane, said intermediate chamber has a curved outer cross section to facilitate formation and rotation of said vortex, said discharging means is an outlet nozzle tangentially positioned with respect to said curved outer cross section of said intermediate chamber, and wherein said solids comprise a sorbent.

17. The combination of claim 16 wherein the upper chamber includes a top opening and a bottom opening with the top opening having a larger cross-sectional area than the bottom opening and further wherein the bottom opening forms the entry to said intermediate chamber.

18. The combination of claim 17 wherein said screening apparatus is located in a first position adjacent to and at least partially above said upper chamber when intermittently delivering said sorbent thereinto.

19. The combination of claim 18 wherein said screening apparatus includes means for relative movement of said pump and screening apparatus between said first position and a second position whereby said sorbent is not received by said upper chamber.

20. The combination of claim 19 wherein said sorbent comprises activated carbon.

* * * * *